Jan. 25, 1944. C. ROSENTHAL Re. 22,425

KNOCK-DOWN CLOSET

Original Filed Aug. 15, 1940 2 Sheets-Sheet 1

INVENTOR.
CHARLES ROSENTHAL
BY
Clark & Ott
ATTORNEYS

Jan. 25, 1944. C. ROSENTHAL Re. 22,425

KNOCK-DOWN CLOSET

Original Filed Aug. 15, 1940 2 Sheets-Sheet 2

INVENTOR.
CHARLES ROSENTHAL

BY Clark & Ott
ATTORNEYS

Reissued Jan. 25, 1944

Re. 22,425

UNITED STATES PATENT OFFICE 22,425

KNOCKDOWN CLOSET

Charles Rosenthal, New York, N. Y.

Original No. 2,299,766, dated October 27, 1942, Serial No. 352,781, August 15, 1940. Application for reissue October 26, 1943, Serial No. 507,708

9 Claims. (Cl. 312—144)

This invention relates to containers for storage of clothing and has particular reference to an improved clothes closet composed of interfitting units each of which is adapted to be collapsed to a flat compact arrangement for storage and shipment and when received by the purchaser, may be set up and assembled without difficulty.

The invention has in view a knock-down closet in which the end walls thereof are hingedly connected to the opposite ends of a spacing strip for movement of the said walls from a collapsed parallel relation with the spacing strip to an expanded right angular set up relation therewith.

The invention more particularly comprehends a knock-down closet composed of interfitting units in which the main walls and a closure constitute one of the units, and the end walls and a spacing strip hingedly connected thereto constitute the other unit and which end walls are swingable from a collapsed parallel relation with the spacing strip to a right angular relation therewith for receiving the main walls of the closet between the end walls and with the spacing strip forming a longitudinal edge of the closure opening, and with which edge the closure engages when in closed condition.

The invention further includes, in a knock-down closet of the indicated character, a rear wall, side walls and a pair of closures integrally and hingedly connected together to form one of the units of the closet and end walls having inwardly directed marginal rims and a spacing strip hingedly connected at its opposite ends to the rims of the end walls respectively to form the other unit and which end walls are swingable from a collapsed parallel relation with the spacing strip to an expanded right angular relation therewith for receiving the opposite ends of the rear, side walls and closures in surrounding relation with the flanges of the end walls and with the spacing strip longitudinally dividing the front of the closet to define a pair of openings and a parting strip between the closures when in closed condition.

With the foregoing and other objects in view, reference is now made to the following specification and the accompanying drawings in which there is illustrated the preferred form of the invention.

Figure 1:
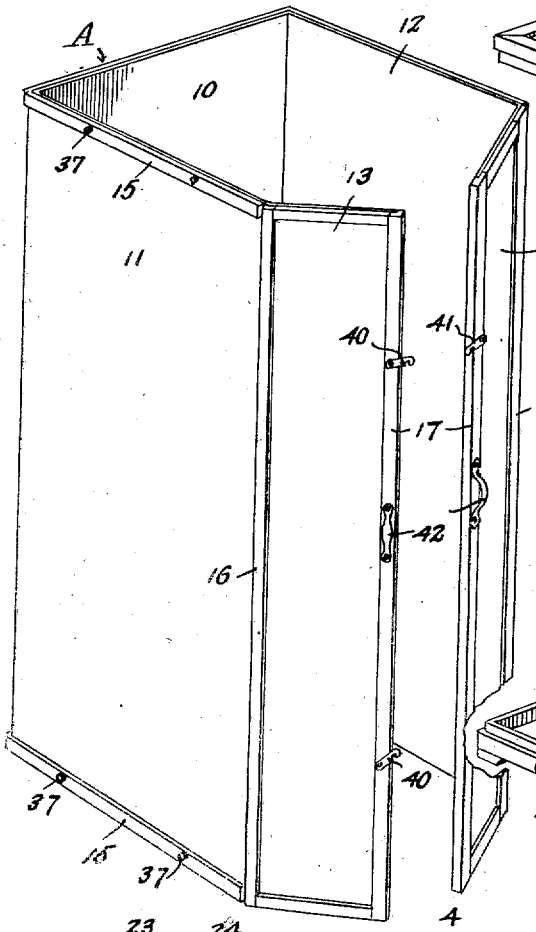
Fig. 1 is a perspective view of the body unit of a knock-down closet.

Referring to the drawings by characters of reference, the closet includes a rear wall 10, oppositely disposed side walls 11 and 12 hingedly connected to the rear wall, and closures 13 and 14 hingedly connected to the side walls respectively, and which walls and closures are preferably fashioned from a length of corrugated cardboard, paperboard or other light inexpensive sheet material to provide an integrally and hingedly connected body section A which is adapted to be collapsed into flatly folded compact arrangement for storage or shipment.

The body unit A is reinforced by relatively stiff material, such as flat wooden strips 15 secured against the outer faces of the rear wall 10 and side walls 11 and 12 adjacent the opposite ends thereof. The closures 13 and 14 are also preferably reinforced by marginal frames 16 of similar material secured against the outer faces thereof adjacent their edges, the inner longitudinally extending strips 17 of the marginal frames having their confronting inner corners longitudinally rabbeted as at 18 and the outer edges thereof longitudinally grooved as at 20 for receiving the inner edges of the closure panels respectively.

The closet also includes a complementary unit, indicated generally by the reference character B, which unit is adapted to interfit with the body unit A to complete the closet. The complementary unit B includes upper and lower end walls 21 and 22, each of which consists of a rectangular panel preferably fashioned from corrugated cardboard, paperboard or other light inexpensive material, and which panel is provided with an inwardly directed marginal frame or rim 23 of wood or other stiff material.

The frames 23 have their inner faces grooved as at 24 in which are secured the edges of the panels and the inner edges and outer faces thereof are rabbeted to provide confronting marginal recesses 25 in which are fitted the opposite ends of the walls of the body unit A when the units are in set-up condition.

Figure 2:
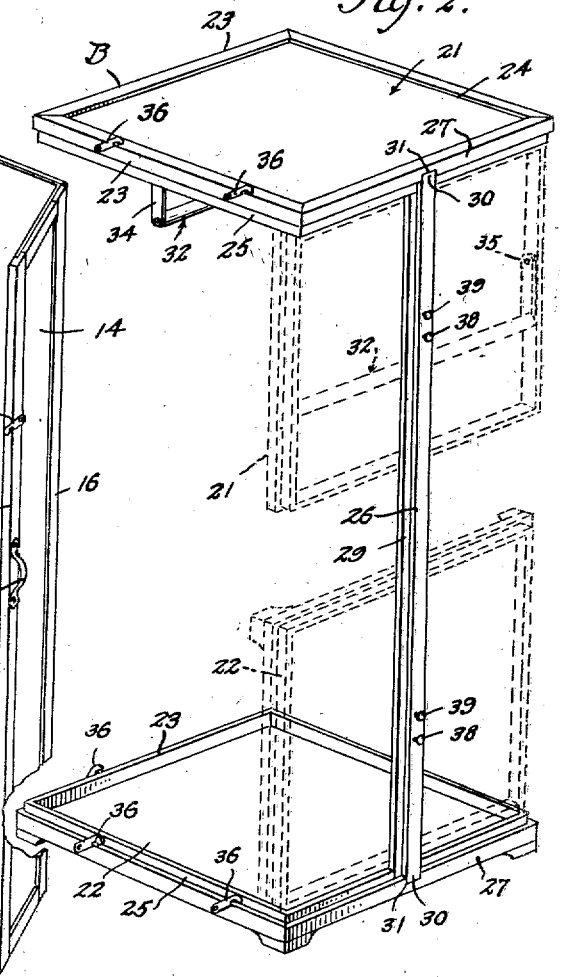
Fig. 2 is a perspective view of a unit embodying the end walls and a parting strip to which they are hingedly connected and showing the same respectively in full and broken lines in set-up and collapsed condition.
Figure 3:
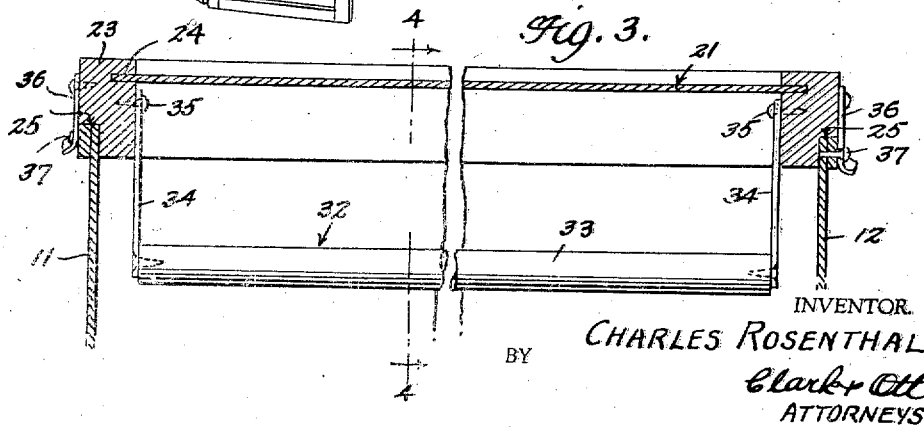
Fig. 3 is an enlarged vertical cross sectional view through the upper end of the closet illustrating the units in assembled relation.
Figure 4:
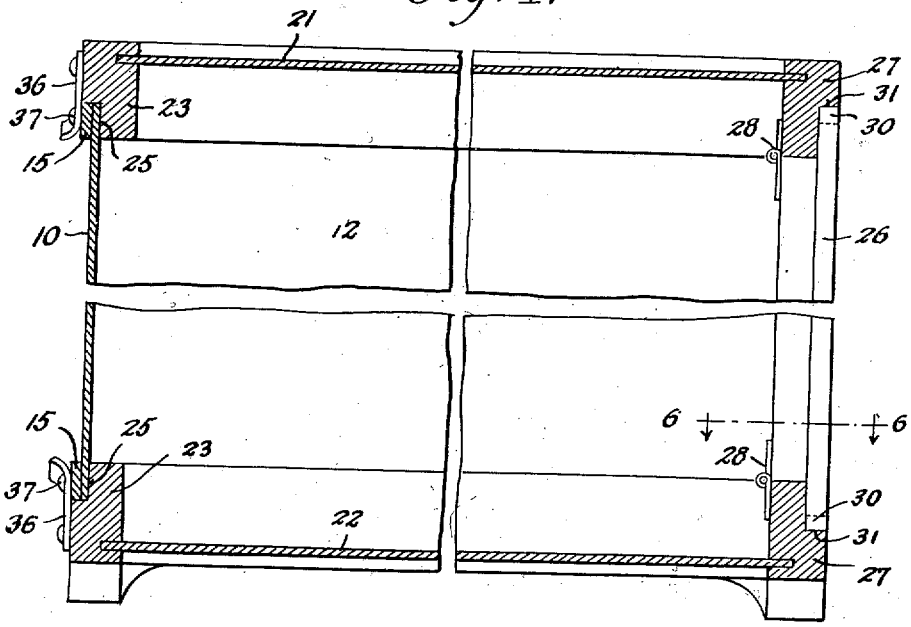
Fig. 4 is an enlarged vertical sectional view taken approximately on the line 4—4 of Fig. 3.
Figure 5:
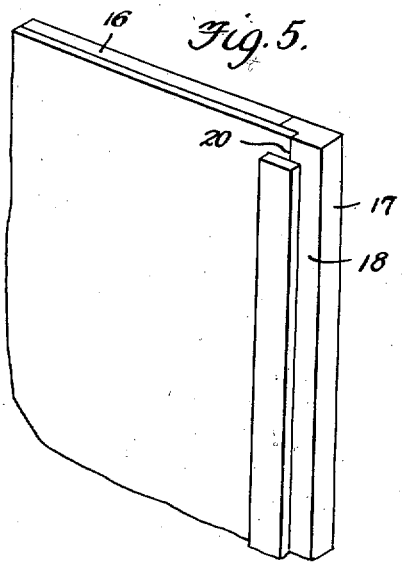
Fig. 5 is a fragmentary detail perspective of the upper corner of one of the doors as viewed from the inner side thereof.
Figure 6:
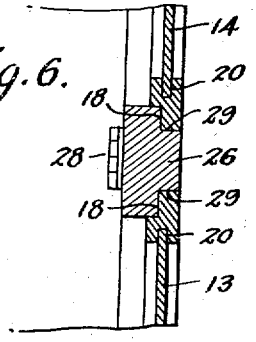
Fig. 6 is an enlarged horizontal sectional view taken approximately on the line 6—6 of Fig. 4.

The end walls 21 and 22 are hinged respectively to the opposite ends of a spacing strip 26 centrally of the front sides 27 of the frames 23 by hinges 28 to permit of the swinging of the said walls inwardly from a set-up condition at right angles to the strip, as shown in full lines in Fig. 2, to a collapsed condition in parallel relation therewith, as shown in broken lines therein.

The spacing strip 26 has its opposite edges longitudinally rabbeted as at 29 and forms with the front side 27 of the frames 23 and the forward edges of the side walls 11 and 12, a pair of openings adapted to be closed by the closures 13 and 14 respectively, with the opposite ends of the closures abutting against the bottom faces of the recesses 25 of the front sides 27 of the frames 23 and with the rabbeted edges of the strips 17 interfitting with the rabbeted edges of the spacing strip 26 for effectively sealing the edges of the closures when in closed condition. The opposite ends of the spacing strips are notched to provide extensions 30 which fit into notches 31 in the forward faces of the sides 27 of the frames 23 when the end walls are swung to set-up condition. A bail 32 providing a hanger bar 33 for receiving garment hangers has its arm 34 pivoted at their upper ends on pins 35 to the opposite sides of the frame 23 of the upper wall 21 for swinging of the bail with the upper wall to a parallel relation therewith when in collapsed condition.

In seting up and assembling the closet from collapsed condition, the end walls 21 and 22 are swung outwardly to dispose the same in right angular relation with the spacing strip 26. The body unit is then expanded and fitted between the end walls with the opposite ends of the rear and side walls of the body section secured in the recesses 25 of the frame 23 by latch and keeper elements 36 and 37 carried by the frames 23 and the reinforcing strips 15 to thereby fasten the sections in assembled set-up condition with the closures 13 and 14 located forwardly of the closet and in position to be swung to closed condition against the connecting strip 26 which serves as a parting strip therebetween. The said strip is provided with keeper elements 38 and 39 adapted to be engaged by latches 40 and 41 carried by the strips 17 of the closures respectively for releasably latching the closures in closed condition. Handles 42 are respectively provided on the strips 17 of the closures for facilitating the opening and closing thereof.

What is claimed is:

1. In a storage closet, a rear wall, side walls hingedly connected to the rear wall, and a pair of closures hingedly connected to the side walls respectively, end walls having rabbeted inwardly directed marginal rims and a spacing strip hingedly connected at its opposite ends to the rims of the end walls respectively for movement of the end walls from a collapsed parallel relation with the spacing strip to an expanded right angular relation therewith for receiving the rear, side walls and closures with the opposite ends thereof disposed in surrounding relation with the rabbeted portion of the said rims, and said spacing strip subdividing the front of the closet to provide with the end walls and opposite side walls a pair of openings, and said spacing strip providing a parting strip between the closures when in closed condition.

2. In a storage closet, a rear wall, side walls hingedly connected to the rear wall, and a pair of closures hingedly connected to the side walls respectively, end walls having inwardly directed marginal rims and a spacing strip hingedly connected at its opposite ends to the rims of the end walls respectively for movement of the end walls from a collapsed parallel relation with the spacing strip to an expanded right angular relation therewith for receiving the rear, side walls and closures with the opposite ends thereof disposed in surrounding relation with the said rims, and said spacing strip subdividing the front of the closet to provide with the end walls and opposite side walls a pair of openings, and said spacing strip providing a parting strip between the closures when in closed condition.

3. In a storage closet, a rear wall, side walls swingably connected to the rear wall, and a closure swingably connected to one of the side walls, end walls having inwardly directed rims, and a spacing strip hingedly connected at its opposite ends to the rims of the end walls respectively for movement of the end walls from a collapsed parallel relation with the spacing strip to an expanded right angular relation therewith for receiving the rear wall, side walls and closure with the opposite ends thereof disposed in surrounding relation with the rims respectively and with closure engaging one of the longitudinal edges of the spacing strip when in closed condition.

4. In a storage closet, upper and lower end walls having inwardly directed marginal rims, a bail having upwardly extending arms pivoted at their ends to the opposite sides of the rim of the upper wall, and a spacing strip hinged at its opposite ends to the rims of the end walls respectively for movement of the end walls from an expanded right angular relation with the spacing strip to a collapsed parallel relation therewith and for swinging of the bail into parallel relation with the upper wall when in collapsed condition.

5. In a storage closet, a rear wall, side walls swingably connected to the rear wall and a closure swingably connected to one of the side walls, end walls having inwardly directed rims, and a spacing strip hingedly connected at its opposite ends to the rims of the end walls respectively for inward swinging movement of said end walls in opposite directions and towards each other to dispose the same into a collapsed parallel relation with the spacing strip and for outward swinging movement into an expanded set up relation with the end walls disposed in right angular relation to the spacing strip for receiving the rear wall, side walls and closure with the opposite ends thereof engaging the rims respectively and with the closure engaging one of the longitudinal edges of the spacing strip when in closed condition, and means for retaining the rear and side walls in engagement with the rims of the end walls.

6. In a storage closet, a pair of complementary units adapted when assembled to provide a box structure having front, rear, side and end walls, one of said units constituting the body and the other including the end walls having inwardly directed externally rabbeted rims and a spacing strip having hinged connection at its opposite ends to said end walls respectively for inward swinging movement of said end walls in opposite directions and towards each other to dispose the same into a collapsed parallel relation with the spacing strip and for outward swinging movement into an expanded set up relation with the end walls disposed in right angular relation to the spacing strip for engagement of the walls of the body in surrounding relation with the rabbeted portions of the rims of the end walls respectively, and means for retaining the walls of the body in engagement with the rims of the end walls.

7. In a storage closet, a pair of complementary units adapted when assembled to provide a box structure having front, rear, side and end walls, one of said units constituting the body and the other including the end walls having inwardly directed marginal rims and a spacing strip having hinged connection at its opposite ends to said end walls respectively for inward swinging movement of said end walls in opposite directions and towards each other to dispose the same into a collapsed parallel relation with the spacing strip and for outward swinging movement into an expanded set up relation with the end walls disposed in right angular relation to the spacing strip for engagement of the walls of the body with the end walls externally of and in surrounding relation with the rims of the end walls, said body including an integral front closure member adapted to engage the spacing strip in its closed position, and means for retaining the body and end walls in engagement with each other.

8. In a storage closet, a rear wall, side walls hingedly connected to the rear wall, and a pair of closures hingedly connected to the side walls respectively, end walls having rabbeted inwardly directed marginal rims and a spacing strip connected at its opposite ends to the rims of the end walls respectively with the end walls disposed in right angular relation therewith when in set up condition for receiving the rear, side walls and closures with the opposite ends thereof disposed in surrounding relation with the rabbeted portion of said rims, and said spacing strip subdividing the front of the closet to provide a pair of openings and forming a parting strip between the closures when in closed condition.

9. In a storage closet, a section forming the body thereof and including front, rear and side walls, end walls having inwardly directed marginal rims formed with rabbeted outer edges and a spacing strip connected at its opposite ends to said end walls respectively with the end walls disposed in right angular relation therewith when in set up condition for engagement of the walls of the body with the end walls thereof and disposed externally of and in surrounding relation with the rabbeted portion of said rims of the end walls, said front wall providing a closure member adapted to engage with the spacing strip in its closed position, and means for retaining the body and end walls in engagement with each other.

CHARLES ROSENTHAL.